US011283611B2

(12) United States Patent
Fujimaki

(10) Patent No.: US 11,283,611 B2
(45) Date of Patent: Mar. 22, 2022

(54) TOKEN MANAGEMENT APPARATUS AND NON-TRANSITORY COMPUTER READABLE MEDIUM STORING TOKEN MANAGEMENT PROGRAM

(71) Applicant: FUJIFILM Business Innovation Corp., Tokyo (JP)

(72) Inventor: Yoshihiro Fujimaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 250 days.

(21) Appl. No.: 16/515,030

(22) Filed: Jul. 18, 2019

(65) Prior Publication Data

US 2020/0304307 A1 Sep. 24, 2020

(30) Foreign Application Priority Data

Mar. 22, 2019 (JP) .............................. JP2019-055425

(51) Int. Cl.
*H04L 29/06* (2006.01)
*H04L 9/08* (2006.01)
*H04L 9/32* (2006.01)

(52) U.S. Cl.
CPC ............ *H04L 9/3213* (2013.01); *H04L 9/083* (2013.01); *H04L 63/0884* (2013.01)

(58) Field of Classification Search
CPC .... H04L 9/3213; H04L 63/0884; H04L 9/083
See application file for complete search history.

(56) References Cited

U.S. PATENT DOCUMENTS

| 9,686,286 | B2 | 6/2017 | Matsugashita |
| 10,325,085 | B1* | 6/2019 | Mortensen ............... G06F 21/40 |
| 2009/0183250 | A1* | 7/2009 | Harada .................... G06F 21/10 726/9 |
| 2013/0047247 | A1* | 2/2013 | Matsuda ............... G06F 21/335 726/9 |
| 2014/0020081 | A1* | 1/2014 | Zhang ................... H04L 63/083 726/9 |
| 2016/0205149 | A1* | 7/2016 | Burch ................. H04L 65/1083 709/228 |
| 2016/0217458 | A1* | 7/2016 | Gaur ................... G06Q 20/3278 |
| 2017/0124558 | A1* | 5/2017 | Molnar .................... H04L 63/08 |
| 2017/0230307 | A1* | 8/2017 | Li ............................ H04W 4/70 |
| 2018/0191700 | A1* | 7/2018 | Kong .................... H04L 41/046 |
| 2019/0108326 | A1* | 4/2019 | Fujimaki ............... H04L 9/3213 |
| 2020/0111087 | A1* | 4/2020 | Zhou ..................... G06Q 20/382 |
| 2020/0213298 | A1* | 7/2020 | Ericson ................. H04W 12/63 |

FOREIGN PATENT DOCUMENTS

JP 2012008958 1/2012

* cited by examiner

*Primary Examiner* — Mohammad A Siddiqi
(74) *Attorney, Agent, or Firm* — JCIPRNET

(57) ABSTRACT

A token management apparatus includes a reception unit that receives, from a first user who has an access token for accessing a service providing server that provides a service, a permission condition for permitting a second user for a conditional use of an access token of the first user, the second user being differential from the first user and not having the access token; and an issuance unit that issues a conditional access token that permits the conditional use of the service within a range of the permission condition, to the second user in a case where the second user requests the conditional use of the access token of the first user, and the request for the conditional use satisfies the permission condition.

9 Claims, 9 Drawing Sheets

FIG. 6

| USER ID OF FIRST USER | URL OF SERVICE PROVIDING SERVER | ACCESS TOKEN | USER ID OF SECOND USER | CONDITIONAL ACCESS TOKEN |
|---|---|---|---|---|
| shain123 | dms.com | at123 | itakuABC | at123-1 |
| shain456 | dms.com | at456 | itakuDEF | at456-1 |
| ⋮ | ⋮ | ⋮ | ⋮ | ⋮ |

PLEASE SET PERMISSION CONDITION OF ACCESS TOKEN OF USER shain 123.

USER TO PERMIT:

| itakuABC | SELECT USER TO BE PERMITTED |

N1, B1

SERVER TO PERMIT:

| dms.com | N2 |

OPERATION TO PERMIT:

| GET/dms/document (REFERENCE OF DOCUMENT) ▼ |
| POST/dms/document (REGISTRATION OF DOCUMENT) |
| PUT/dms/document (UPDATE OF DOCUMENT) |
| DELETE/dms/document (DELETION OF DOCUMENT) |

B2, PM

DOCUMENT TO PERMIT: N3  B3

| 000,001,002,003 | SELECT DOCUMENT |

PERIOD TO PERMIT: N5

| 20170201T0000 | − | 20170207T2359 |

N4

B4

| OK |

FIG. 8

| USER ID OF FIRST USER | URL OF SERVICE PROVIDING SERVER | CONTENT OF OPERATION | DOCUMENT NAME | PERMISSION TIME PERIOD |
|---|---|---|---|---|
| shain123 | dms.com | REFERENCE, REGISTRATION | 000,001,002,003,004 | 20170201T0000-20170207T2359 |
| shain456 | dms.com | UPDATE, DELETION | 0004,0005 | 20171115T0000-20171215T2359 |
| .. | .. | .. | .. | .. |

16B

TOKEN MANAGEMENT APPARATUS AND NON-TRANSITORY COMPUTER READABLE MEDIUM STORING TOKEN MANAGEMENT PROGRAM

CROSS-REFERENCE TO RELATED APPLICATIONS

This application is based on and claims priority under 35 USC 119 from Japanese Patent Application No. 2019-055425 filed Mar. 22, 2019.

BACKGROUND

(i) Technical Field

The present invention relates to a token management apparatus and a non-transitory computer readable medium storing a token management program.

(ii) Related Art

JP2012-008958A discloses an authority transfer system including a processing request unit, an authority transfer unit, and a management unit, in which the processing request unit includes a generation unit that generates a request including processing information indicating a content of a processing in response to a request of the processing from a user device operated by a user, the authority transfer unit has a transmission unit that receives the request generated by the generation unit and transmits a request including the processing information to the management unit based on the request, the management unit has a determination unit that receives the request transmitted by the transmission unit, and determines whether or not the processing can be executed by the management unit based on the processing information included in the request, and the authority transfer unit further includes a decision unit that decides to transfer the authority of the user with respect to the management unit to the processing request unit, in a case where it is determined by the determination unit that the processing can be executed.

SUMMARY

Aspects of non-limiting embodiments of the present disclosure relate to a token management apparatus and a token management program that allow a second user who, unlike a first user having an access token to a service providing server that provides a service, does not have the access token to the service providing server, to use the service conditionally.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a token management apparatus including a reception unit that receives, from a first user who has an access token for accessing a service providing server that provides a service, a permission condition for permitting a second user for a conditional use of an access token of the first user, the second user being differential from the first user and not having the access token; and an issuance unit that issues a conditional access token that permits the conditional use of the service within a range of the permission condition, to the second user in a case where the second user requests the conditional use of the access token of the first user, and the request for the conditional use satisfies the permission condition.

BRIEF DESCRIPTION OF THE DRAWINGS

Exemplary embodiment(s) of the present invention will be described in detail based on the following figures, wherein:

FIG. 6 is a diagram showing an example of an access token database;

FIG. 7 is a diagram showing an example of a setting screen of permission conditions;

FIG. 8 is a diagram showing an example of a permission condition database; and

Hereinafter, exemplary embodiments of the present invention will be described in detail with reference to the drawings.

Figure 1:
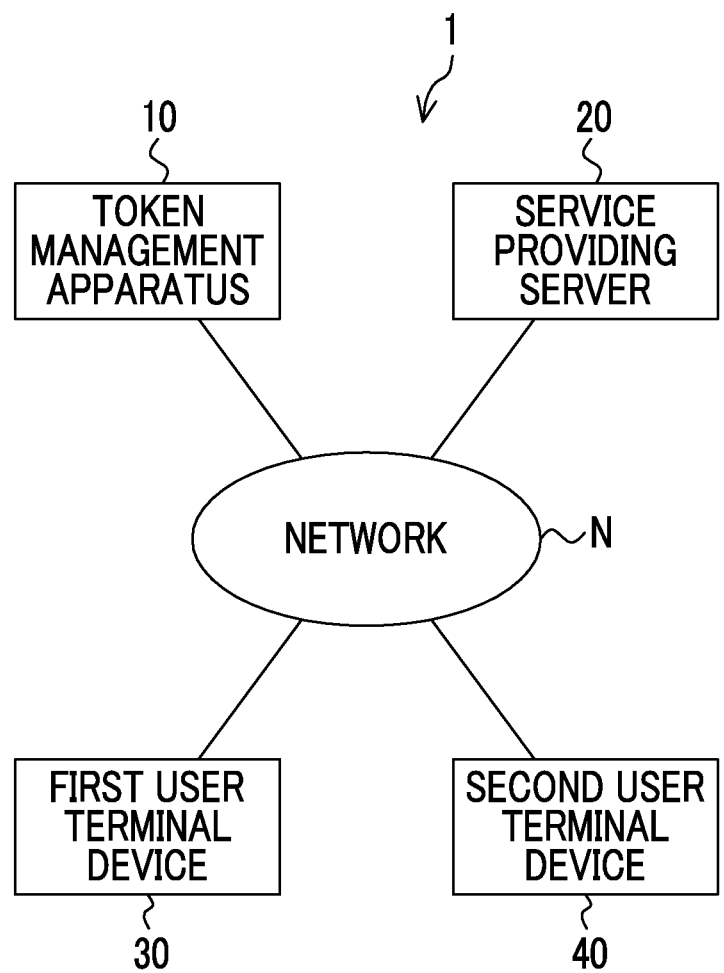
FIG. 1 is a block diagram showing a token management apparatus system.

FIG. 1 is a block diagram of a token management system 1.

The token management system 1 has a configuration in which a token management apparatus 10, a first user terminal device 30, a second user terminal device 40, and a service providing server 20 are connected through a network N.

The token management system 1 may include a plurality of the token management apparatuses 10, the first user terminal devices 30, the second user terminal devices 40, and the service providing servers 20, respectively.

The token management apparatus 10 manages an access token of a user who uses a service provided by the service providing server 20.

In this example, the access token is an identification code issued to a user authorized to use the service.

The service providing server 20 serves as an ID management device (IdP: Identity Provider) that manages user information such as a user ID and password of the user who uses the service.

The service providing server 20 performs user authentication for the user who uses the service, and issues an access token in a case where the authentication is successful.

Note that the ID management device may be an independent device.

The service providing server 20 provides a service.

In this example, the service is an electronic processing to be provided to the user, and includes a processing related to document management, a processing related to storage management, and a processing related to transmission and reception of mail, for example, but is not limited thereto.

In this embodiment, the case in which the service providing server 20 is a document management server will be described as an example.

The first user terminal device 30 is a terminal device used by a first user having an access token for accessing the service providing server 20 that provides the service.

The first user uses the first user terminal device 30 to use the service provided by the service providing server 20.

The second user terminal device 40 is a terminal device used by a second user who, unlike the first user, does not have access token.

The relationship between the first user and the second user may be a relationship between an employee responsible for product development in a development department (hereafter referred to as "employee") and an employee of an outsourcing company that outsources product development (hereafter referred to as a "client").

Then, for example, in a case where a document related to development such as a specification is managed by the service providing server 20 as a document management server, the employee has an access token and so can access the specification, but the client does not have an access token and cannot access the specification.

In such a case, every time the client requires the specification, the employee accesses the service providing server 20 to acquire the specification and passes the specification to the client, which is cumbersome.

Therefore, the token management apparatus 10 receives from the first user a permission condition for permitting the conditional use of the access token of the first user (employee), and in a case where the second user (client) requests the conditional use of the access token of the first user, and the request of the conditional use satisfies the permission condition, issues a conditional access token for permitting the conditional use of the service within a range of the permission condition to the second user.

As a result, even in a case where the second user does not have an access token, the second user can conditionally use the service, that is, obtain a specification, for example.

Note that conditional use includes not only the use of some functions of the service but also the use of all the functions of the service.

Figure 2:
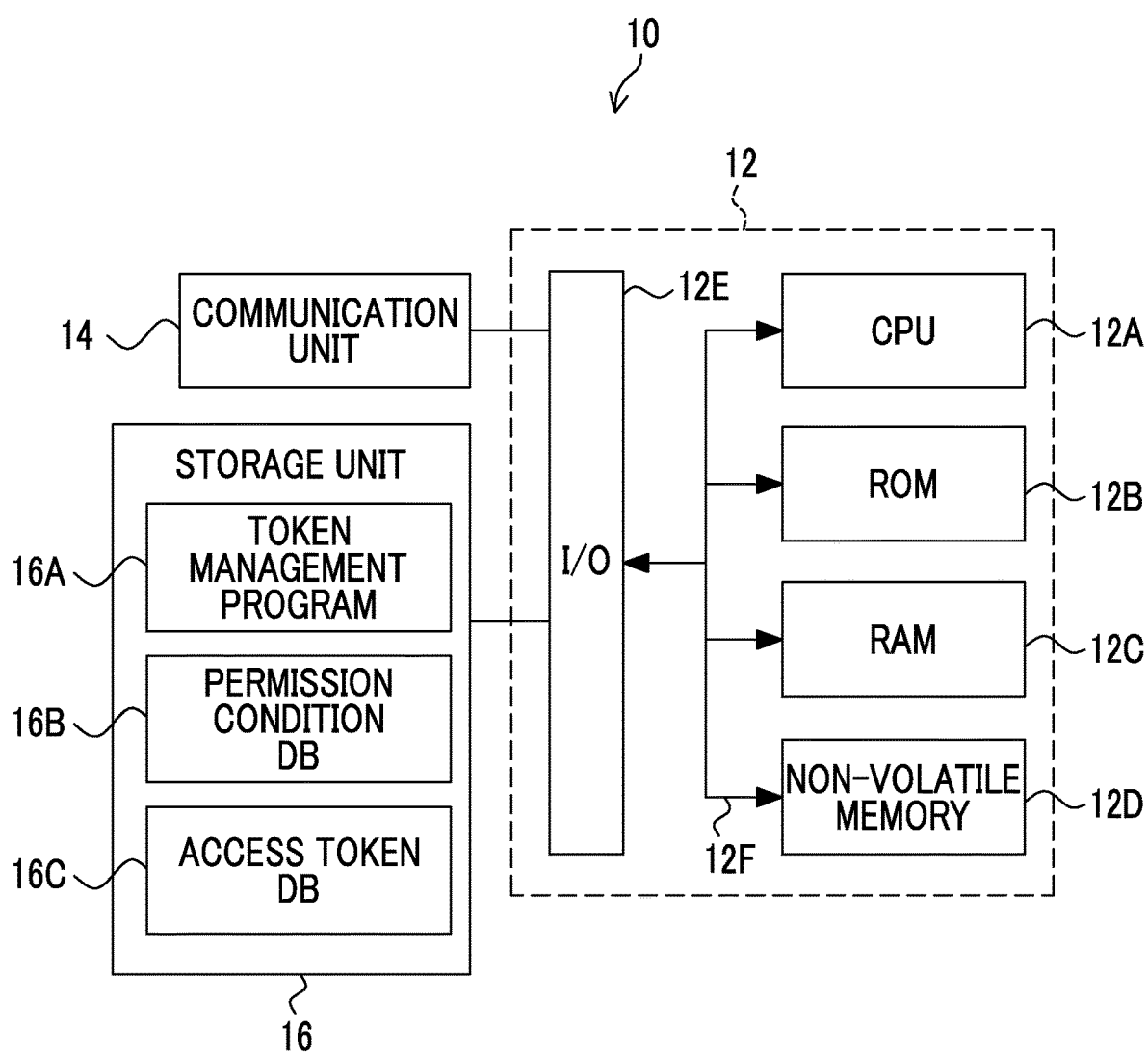
FIG. 2 is a block diagram showing an electrical configuration of a token management apparatus.

FIG. 2 is a block diagram of the token management apparatus 10.

The token management apparatus 10 is configured of a device including a general computer.

As shown in FIG. 2, the token management apparatus 10 includes a controller 12.

The controller 12 includes a central processing unit (CPU) 12A, a read only memory (ROM) 12B, a random access memory (RAM) 12C, a non-volatile memory 12D, and an input/output interface (I/O) 12E.

The CPU 12A, the ROM 12B, the RAM 12C, the non-volatile memory 12D, and the I/O 12E are connected to each other through a bus 12F.

Further, a communication unit 14 and the storage unit 16 are connected to the I/O 12E.

The communication unit 14 is an interface for performing data communication with an external device.

The storage unit 16 is configured of a non-volatile storage device such as a hard disk, and stores a token management program 16A, a permission condition database (DB) 16B, an access token database (DB) 16C, and the like described below.

The CPU 12A reads and executes the token management program 16A stored in the storage unit 16.

Next, a functional configuration of the CPU 12A in a case where the token management apparatus 10 executes the token management program 16A will be described.

Figure 3:
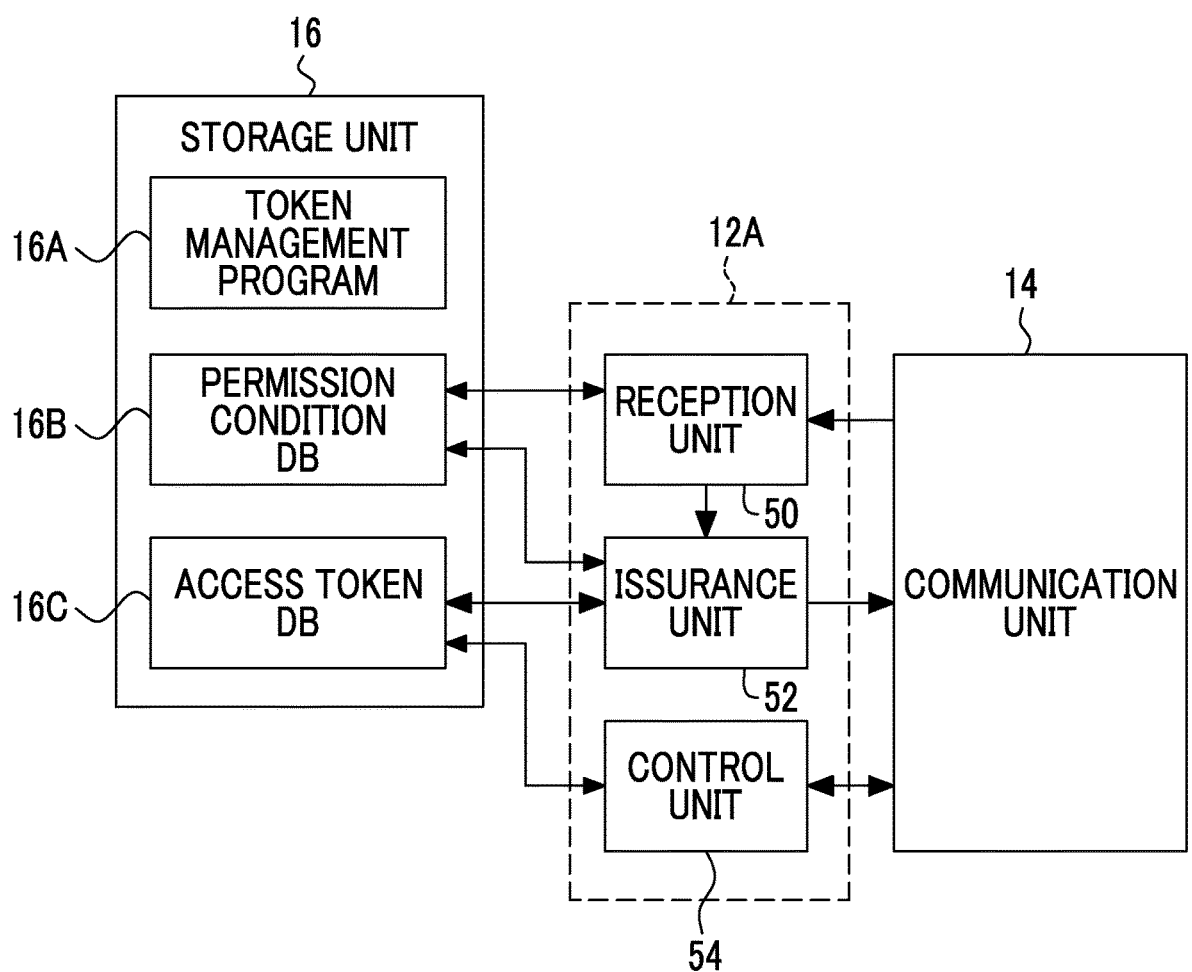
FIG. 3 is a block diagram showing a functional configuration of the token management apparatus.

As shown in FIG. 3, the CPU 12A functionally includes a reception unit 50, an issuance unit 52, and a control unit 54.

The reception unit 50 receives from a first user a permission condition for permitting a conditional use of an access token of the first user, for a second user who, unlike the first user who has an access token for accessing the service providing server 20 that provides the service, does not have the access token.

In a case where the second user requests the conditional use of the access token of the first user and the request of the conditional use satisfies the permission condition, the issuance unit 52 issues a conditional access token for permitting the conditional use of the service within the range of the permission condition to the second user.

In addition, the issuance unit 52 has a function of notifying the second user of the permission condition in a case where the second user requests the conditional use of the access token of the first user and the request of the conditional use does not satisfy the permission condition.

In addition, the issuance unit 52 has a function of notifying the first user to permit the use of the service requested by the second user in a case where the second user requests the conditional use of the access token of the first user and the request of the conditional use does not satisfy the permission condition.

Further, the issuance unit 52 has a function of requesting the first user to log in in a case where the second user requests the conditional use of the access token of the first user, and issuing a conditional access token in a case where the first user logs in.

In a case where of being requested the conditional use of the service from the second user, and receiving the conditional access token, the control unit 54 controls so that the service providing server 20 is requested the use of the service, in a case where the received conditional access token matches the conditional access token stored in the storage unit 16.

Further, the control unit 54 has a function of deleting the conditional access token from the storage unit 16 in a case where the predetermined deletion condition is satisfied.

Here, the deletion condition may be satisfied in a case where deletion of the conditional access token is instructed from the first user or the second user, for example.

In addition, the deletion condition may be satisfied in a case where a predetermined time period is elapsed from issuance or most recent use of the conditional access token or start of use or most recent use of the service.

In addition, the deletion condition may be satisfied in a case where a predetermined time period is elapsed from the occurrence of an event related to the service.

In addition, the control unit 54 has a function of notifying the second user that an event occurs, that is, notifying that a document is updated, for example.

In addition, the control unit 54 has a function of notifying the second user at a predetermined timing before a predetermined time period is elapsed.

Next, the operation of the token management apparatus 10 according to the present embodiment will be described.

As shown in FIG. 2, the token management program 16A is stored in the storage unit 16.

Figure 4:
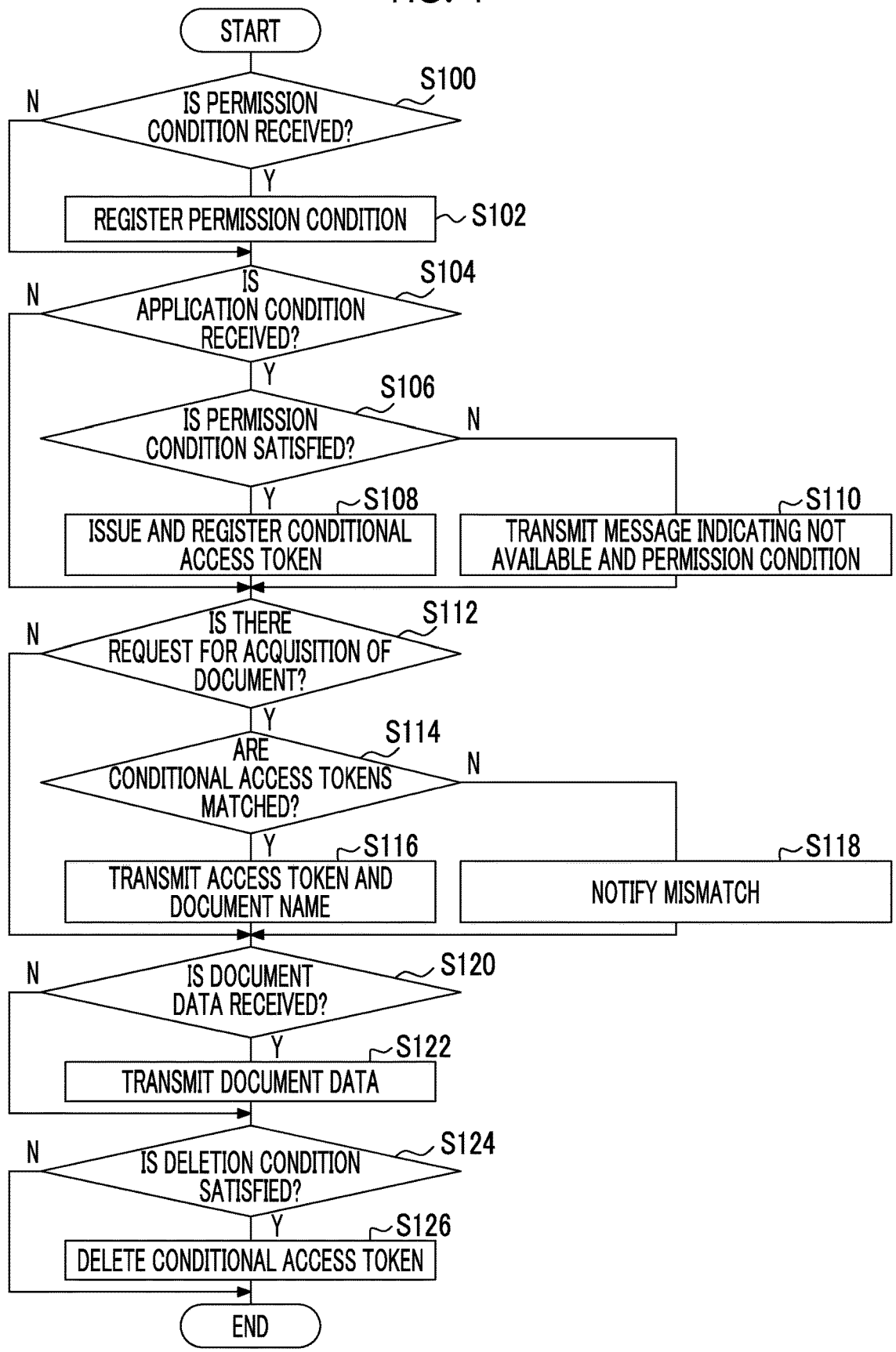
FIG. 4 is a flowchart showing an example of a processing flow of the token management program.

The CPU 12A reads and executes the token management program 16A, so that the token management processes shown in FIG. 4 is executed.

The token management processes shown in FIG. 4 are reiterated at predetermined time intervals.

Figure 5:
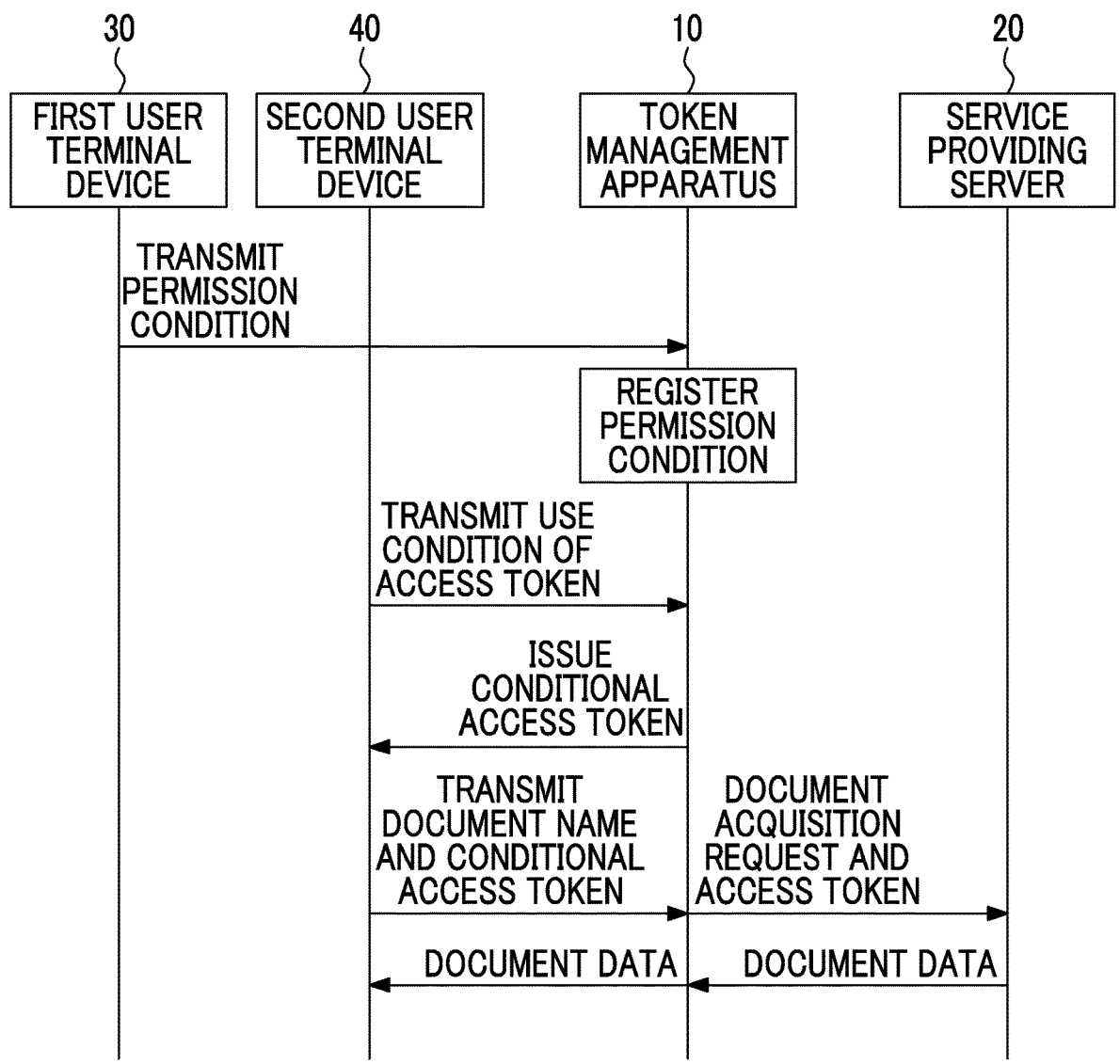
FIG. 5 is a sequence diagram showing an outline of communication flow of each device.

In addition, FIG. 5 shows a sequence diagram showing an outline of the flow of communication between the devices.

It is assumed that the access token for the first user to access the service providing server 20 is issued from the service providing server 20 according to a predetermined access token issuance protocol, and is registered in the access token DB 16C.

Examples of the access token issuing protocol include OAuth 2.0 and the like, but not limited thereto.

As shown in FIG. 6, the access token DB 16C is a database representing a corresponding relationship between a user ID of the first user, the uniform resource locator (URL) representing the connection destination of the service providing server 20, an access token issued to the first user, a user ID of the second user, and a conditional access token issued to the second user.

In a case of conditionally permitting the second user to use the access token, the first user sets the permission condition and transmits it to the token management apparatus 10.

FIG. 7 shows a setting screen G1 of the permission condition for permitting the conditional use of the access token.

As shown in FIG. 7, the setting screen G1 includes an input field N1 for inputting a second user who is permitted the conditional use, a selection button B1 for selecting the second user who is permitted the conditional use, an input field N2 for inputting a connection destination of the service providing server 20 that permits the conditional use, a selection button B2 for selecting an operation for permitting the conditional use, an input field N3 for inputting a document name of a document for which the conditional use is permitted, a selection button B3 for selecting a document for which the conditional use is permitted, an input field N4 for inputting start date and time of a permission time period during which the conditional use is permitted, an input field N5 for inputting end date and time of the permission time period, and an OK button B4 for deciding the input content.

The example of FIG. 7 shows a state in which the selection button B2 is pressed and so the pull-down menu PM is displayed.

As shown in FIG. 7, as an example, "reference of document", "registration of document", "update of document", and "deletion of document" may be selected.

The first user inputs necessary items on the setting screen G1 displayed on the first user terminal device 30, shown in FIG. 7, and presses the OK button B4.

As a result, as shown in FIG. 5, the permission condition set by the first user is transmitted from the first user terminal device 30 to the token management apparatus 10.

In step S100, it is determined whether or not the permission condition is received from the first user terminal device 30.

Then, in a case where the permission condition is received, the process proceeds to step S102, and in a case where the permission condition is not received, the process proceeds to step S104.

In step S102, as shown in FIG. 5, the permission condition received in step S100 is registered in the permission condition DB 16B.

As shown in FIG. 8, the permission condition DB 16B is a database representing the corresponding relationship between the user ID of the first user, the URL of the service providing server 20, the content of operation for permitting the second user to use the conditional access, a document name of a document for which the second user is permitted the conditional use, and a permission time period during which the conditional use of the document is permitted.

The second user attempting to conditionally use the access token of the first user sets an application condition and transmits it to the token management apparatus 10.

Figure 9:
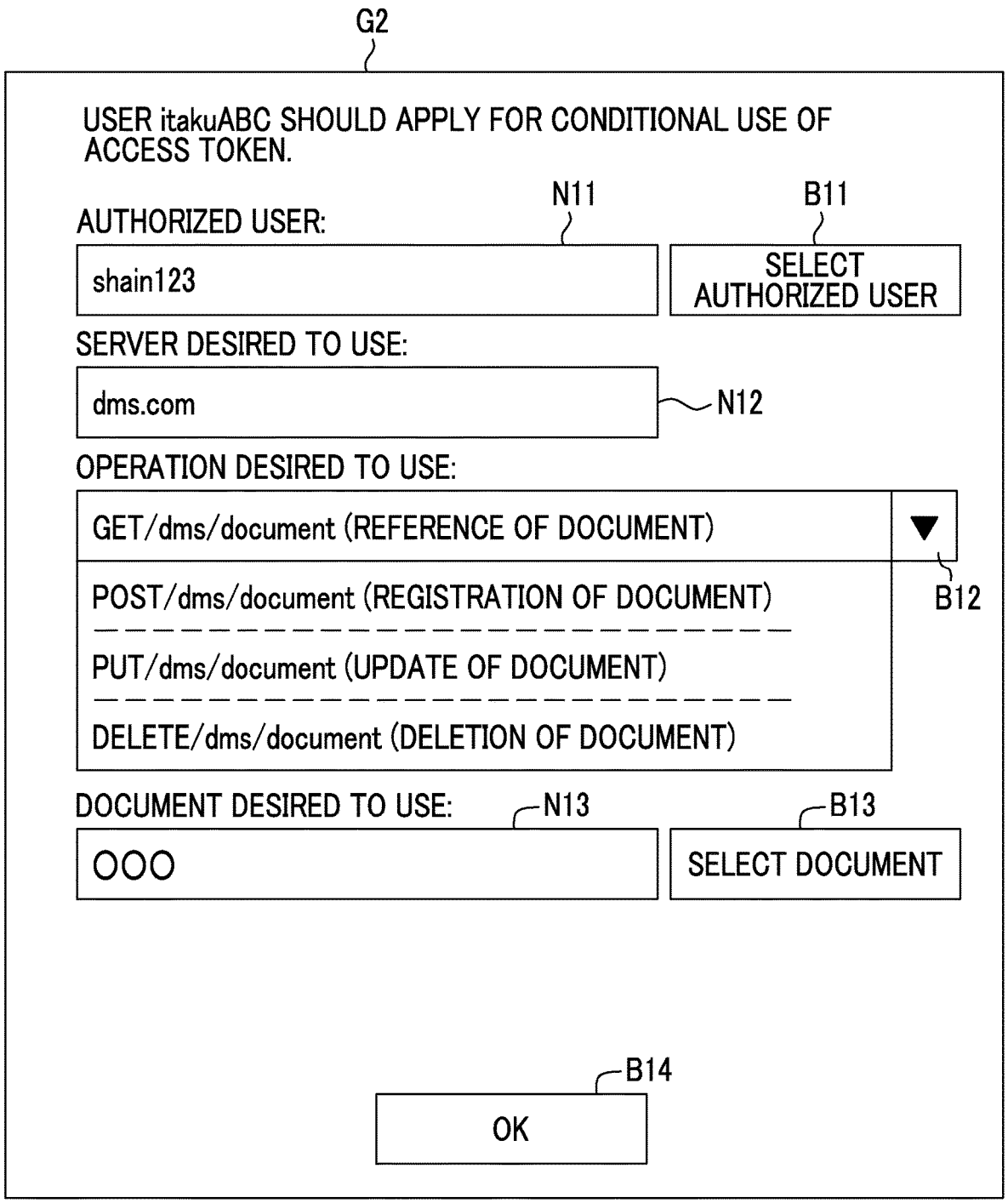
FIG. 9 is a diagram showing an example of an application screen for applying for conditional use of an access token.

FIG. 9 shows an application screen G2 for applying for conditional use of the access token.

As shown in FIG. 9, the application screen G2 includes an input field N11 for inputting a user ID of the first user who has an access token requested for the conditional use, a selection button B11 for selecting a first user who has an access token requested for the conditional use, an input field N12 for inputting the URL of the service providing server 20 requested for the conditional use, a selection button B12 for selecting an operation requested for the conditional use, an input field N13 for inputting a document name of a document requested for the conditional use, a selection button B13 for selecting a document requested for the conditional use, and an OK button B14 for deciding the input content.

The second user inputs necessary items on the application screen G2 displayed on the second user terminal device 40, shown in FIG. 9, and presses the OK button B14.

As a result, the application condition set by the second user is transmitted from the second user terminal device 40 to the token management apparatus 10.

In step S104, it is determined whether or not an application condition is received from the second user terminal device 40.

Then, in a case where the application condition is received, the process proceeds to step S106, and in a case where the application condition is not received, the process proceeds to step S112.

In step S106, it is determined whether or not the application condition received in step S104 satisfies the permission condition.

Specifically, by referencing to the permission condition DB 16B stored in the storage unit 16, it is determined whether or not there is a permission condition among the permission conditions registered in the permission condition DB 16B that is satisfied by the application condition received in step S104.

Then, in a case where there is a permission condition satisfied by the application condition, the process proceeds to step S108, and in a case where no application condition is satisfied by the permission condition, the process proceeds to step S110.

In step S108, a conditional access token is issued.

That is, as shown in FIG. 5, the conditional access token is generated and transmitted to the second user terminal device 40.

In addition, the issued conditional access token is registered in the access token DB 16C.

Meanwhile, in step S110, a message indicating that the access token of the first user is not available, and the permission condition required for use of the access token of the first user are transmitted to the second user terminal device 40 to notify the second user.

As a result, the second user understands the permission conditions required to use the access token of the first user.

It may be possible to notify the first user by transmitting a message requesting permission to use the service requested by the second user to the first user terminal device 30.

As a result, this prompts the first user to set the permission condition.

In addition, in a case where the second user requests the conditional use of the access token of the first user, the first user may be requested to log in, and in a case where the first user logs in, a conditional access token may be issued.

The second user is able to acquire the document from the service providing server 20 in a case where the conditional access token is issued.

In this case, as shown in FIG. 5, the second user transmits, by the second user terminal device 40, the document name of the document desired to be acquired and the issued conditional access token to the token management apparatus 10, and requests an acquisition of the document. The second user may input the conditional access token to the second user terminal device 40, or may transmit the conditional access token stored in the internal memory of the second user terminal device 40.

In step 112, it is determined whether or not the acquisition of the document is requested, that is, it is determined whether or not the document name and the conditional access token are received from the second user terminal device 40.

Then, in a case where the document name and the conditional access token are received, the process proceeds to step S114. In a case where the document name and the conditional access token are not received, the process proceeds to step S120.

In step S114, it is determined whether or not the conditional access token received in step S112 matches the conditional access token stored in the storage unit 16.

Specifically, among the conditional access tokens registered in the access token DB 16C, it is determined whether or not there is a conditional access token that matches the conditional access token received in step S112.

Then, in a case where there is a conditional access token that matches the conditional access token received in step S112, the process proceeds to step S116, and in a case where there is no conditional access token that matches the conditional access token received in step S112, the process proceeds to step S118.

In step S116, as shown in FIG. 5, the access token of the first user corresponding to the conditional access token received in step S112 is acquired after a registry in the access token DB 16C, and is transmitted to the service providing server 20 together with the document name, to request the service providing server 20 for the use the service.

Meanwhile, in step S118, a message indicating that the conditional access token received in step S112 and the conditional access token stored in the storage unit 16 do not match with each other is transmitted to the second user terminal device 40 to notify the second user.

In step S120, it is determined whether or not the document data of the requested document is received from the service providing server 20.

Then, in a case where the document data is received, the process proceeds to step S122, and in a case where the document data is not received, the process proceeds to step S124.

In step S122, as shown in FIG. 5, the document data received in step S120 is transmitted to the second user terminal device 40.

As a result, the second user may use the document within a range of the permission condition.

In step S124, it is determined whether or not a predetermined deletion condition is satisfied.

Then, in a case where the deletion condition is satisfied, the process proceeds to step S126, and in a case where the deletion condition is not satisfied, the present routine is ended.

Here, the deletion condition may be satisfied in a case where, for example, deletion of the conditional access token is instructed from the first user or the second user.

In addition, the deletion condition may be satisfied in a case where a predetermined time period is elapsed from issuance or most recent use of the conditional access token or start of use or most recent use of the service.

A predetermined time period is set to a time period (for example, 24 hours or the like) that is likely to raise security problems in a case where the conditional access token is maintained even after the predetermined time period is elapsed from the issuance or the most recent use of the conditional access token or the start of use or the most recent use of the service.

In this case, the second user may be notified at a predetermined timing before the predetermined time period is elapsed.

The predetermined timing is set to a timing that allows the second user to deal with so that the conditional access token is not expired, for example.

In addition, the deletion condition may be satisfied in a case where a predetermined time period is elapsed from the occurrence of an event related to the service.

A predetermined time period is set to a time period (for example, 24 hours or the like) that is likely to raise security problems in a case where a conditional access token is maintained even after the predetermined time period is elapsed from the occurrence of the event.

In this case, the second user may be notified at a predetermined timing before the predetermined time period is elapsed.

The predetermined timing is set to a timing that allows the second user to deal with so that the conditional access token is not expired, for example.

In addition, examples of the event may include update of a document set in the application condition.

Note that the occurrence of an event may be notified to the second user terminal device 40.

For example, in a case where the first user who is an employee updates a document such as a specification, in a case where the specification is updated, the second user who is a client is automatically notified.

For this reason, the second user does not have to check the specification update with the first user one by one, and may quickly check the updated specification.

In this case, in a case where the document is updated, the service providing server 20 needs to notify the token management apparatus 10 that the document is updated.

In step S126, the conditional access token satisfying the deletion condition is deleted from the access token DB 16C.

Thus, in the present embodiment, even in a case where the second user, unlike the first user who has an access token for accessing the service providing server 20 that provides the service, does not have the access token, the conditional access token is issued to the second user in a case where the permission condition for permitting the conditional use of the access token set by the user 1 is satisfied.

This eliminates the need for the second user to acquire the document through the first user each time the document is needed.

Although the embodiments have been described above, the technical scope of the present invention is not limited to the scope described in the above embodiments.

Various changes or improvements may be added to the embodiment described above within the scope without departing from the spirit of the present invention, and embodiments to which the changes or improvements are added are also included in the technical scope of the present invention.

In addition, the above embodiment does not limit the invention according to the claims, and not all combinations of features described in the embodiments are essential to the solution means of the invention.

The embodiments described above include inventions of various stages, and various inventions are extracted by a combination of a plurality of disclosed constituent elements. Even in a case where certain elements are deleted from the elements illustrated in the embodiment, the configuration without the certain removed elements may be extracted as the invention as long as the effects may be obtained.

In addition, in the above embodiment, the case in which the token management program is installed in advance in the storage unit 16 is described, but the present invention is not limited thereto.

For example, the token management program may be provided by being stored in a storage medium such as a compact disc read only memory (CD-ROM) or provided through a network.

Furthermore, in the above embodiment, the token management processes are realized by a software configuration using a computer by executing a program, but the present invention is not limited thereto.

For example, the token management processing may be realized by a hardware configuration or a combination of the hardware configuration and the software configuration.

In addition, the configuration of the token management apparatus 10 (see FIG. 2) described in the above embodiment is an example, and needless to say, unnecessary parts may be deleted or new parts may be added within the scope without departing from the spirit of the present invention.

Further, the flow of processing of the token management program 16A (see FIG. 4) described in the above embodiment is also an example, and needless to say, unnecessary steps may be deleted, new steps may be added, or the processing order may be changed within the scope without departing from the spirit of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A token management apparatus, comprising:
    a reception unit that receives, from a first user who has an access token for accessing a service providing server that provides a service, a permission condition for permitting a second user for a conditional use of an access token of the first user, the second user being differential from the first user and not having the access token;
    an issuance unit that issues a conditional access token that permits the conditional use of the service within a range of the permission condition, to the second user in a case where the second user requests the conditional use of the access token of the first user, and the request for the conditional use satisfies the permission condition;
    a storage unit that stores the conditional access token; and
    a control unit performs control to request the use of the service to the service providing server in a case where the conditional use of the service is requested from the second user,
    wherein the control unit deletes the conditional access token from the storage unit in a case where a predetermined deletion condition is satisfied,
    wherein the deletion condition is an occurrence of an event related to the service,
    wherein the service providing server is a document management server that manages a document, and the occurrence of the event is update of the document, and
    wherein the deletion condition is satisfied in a case where a predetermined time period is elapsed from issuance or most recent use of the conditional access token or from start of use or most recent use of the service.

2. The token management apparatus according to claim 1, wherein the deletion condition is satisfied in a case where deletion of the conditional access token is instructed from the first user or the second user.

3. The token management apparatus according to claim 1, wherein the control unit notifies the second user that the event occurs.

4. The token management apparatus according to claim 1, wherein the control unit notifies the second user at a predetermined timing before the predetermined time period is elapsed.

5. The token management apparatus according to claim 3, wherein the control unit notifies the second user at a predetermined timing before the predetermined time period is elapsed.

6. The token management apparatus according to claim 1, wherein the issuance unit notifies the second user of the permission condition in a case where the second user requests the conditional use of the access token of the first user and the request of the conditional use does not satisfy the permission condition.

7. The token management apparatus according to claim 1, wherein the issuance unit notifies the first user to permit the use of the service requested by the second user in a case where the second user requests the conditional use of the access token of the first user and the request for the conditional use does not satisfy the permission condition.

8. The token management apparatus according to claim 1, wherein the issuance unit requests the first user to log in in a case where the second user requests the conditional use of the access token of the first user, and issues the conditional access token in a case where the first user logs in.

9. A non-transitory computer readable medium storing a token management program for causing a computer to function as each unit of the token management apparatus according to claim 1.

* * * * *